Patented Oct. 3, 1950

2,524,084

UNITED STATES PATENT OFFICE 2,524,084

PEROXIDIC SULFONIC ACIDS AND SALTS

Frederick F. Rust, Oakland, and Alan R. Stiles and William E. Vaughan, Berkeley, Calif., assignors to Shell Development Company, San Francisco, Calif., a corporation of Delaware No Drawing. Application February 21, 1949, Serial No. 77,692

10 Claims. (Cl. 260—505)

This invention relates to sulfonic acids (and their metal salts) in which the organic portion of the molecule contains a peroxy (—O—O—) group. The invention provides a new class of compounds, peroxidic sulfonic acids (and salts thereof) in which the sulfo (—SO₃H) group replaces one or more hydrogen atoms of an organic peroxide of the class defined below.

This application is a continuation-in-part of our copending application Serial No. 792,840, filed December 19, 1947, now Patent Number 2,519,403. Our earlier filed application describes and claims a novel reaction process by which certain organic peroxides can be sulfohalogenated to form the novel peroxidic sulfonyl halides, which are also described and claimed therein. This application describes and claims the class of novel compounds which can be prepared by the action of water or a metal hydroxide upon certain peroxidic sulfonyl halides under reaction conditions suitable for the conversion of an alkyl or aryl sulfonyl halide to a sulfonic acid or salt.

The invention provides polyfunctional compounds which are either sulfonic acids or the salts of sulfonic acids and which are at the same time, substituted peroxides of the following class: peroxides composed of two tertiary hydrocarbon radicals or their halogen-analogs that contain one or more chlorine or bromine atoms, connected by a peroxy group attached to a tertiary-carbon atom in each radical; and which peroxides are substituted by the replacement of one or more hydrogen atoms with sulfo groups or, in the case of the salts, with —SO₃M groups where M represents a metal.

In general, the peroxy grouping in an organic molecule is so unstable that a compound containing it, if it reacts under a given set of conditions, undergoes a reaction involving the bonds of this grouping. We have now discovered, however, that when the grouping is contained between two tertiary carbon atoms, not only can the compound be sulfohalogenated, but derivatives of the sulfonyl halide can be formed, and such derivatives exhibit both the chemical properties characteristic of the derivative and of the particularly stable class of peroxides.

Illustrative examples of the compounds provided by the present invention include aliphatic sulfonic acids such as 2-methyl-2-tertiary-butyl-peroxypropanesulfonic acid, bis(sulfo-tertiary-butyl) peroxide and 4 - tertiary - butylperoxy - 4 - methylcyclohexanesulfonic acid; aromatic sulfonic acids such as 2-(α,α-dimethylbenzylperoxy)-2-methylpropanesulfonic acid, 2-phenyl-2-(α,α-dimethylbenzylperoxy)propanesulfonic acid, 4-methyl - 4(chloro - tertiary - butylperoxy)pentanesulfonic acid; and metal salts of the sulfonic acids such as the potassium, sodium, calcium, barium, and magnesium salts of the above sulfonic acids.

A preferred class of compounds provided by the invention consists of the sulfonic acids which are substituted di-tertiary-alkyl peroxides, or their halogen-analogs that contain one or more chlorine or bromine atoms, in which the substituted peroxide groups consist of at least one sulfo group; and the metal salts of such sulfonic acids in which the metallic ion has a normal valence of not more than two. The preferred class is typified by acids such as 2-methyl-2-tertiary-butylperoxypropanesulfonic acid, bis(sulfo-tertiary-butyl) peroxide, and 3-methyl-3-(bromo-tertiary-butylperoxy) butanesulfonic acid; and salts such as the sodium, potassium and calcium salts of such acids.

As is the case with substantially any organic compound, the compounds provided by the present invention can be prepared by various methods of synthesis. We have found that a particularly suitable method of preparing them comprises the conversion of the corresponding sulfonyl halides by any of the general methods, which do not involve the necessary employment of high temperature, for converting alkyl or aryl sulfonyl halides to acids or metal salts of the acids.

A particularly suitable method of producing sulfonyl halides suitable for conversion to the compounds provided by the present invention comprises the sulfochlorination of the corresponding peroxide by contacting it with a mixture of sulfur dioxide and chloride, while it is maintained in the liquid phase, in the presence of actinic radiations and at a temperature below its decomposition temperature (the process of our earlier filed application). When a di-tertiary-alkyl peroxide, or its halogen-analog that contains one or more chlorine or bromine atoms, is sulfohalogenated in this manner it can be converted, without isolation from the reaction mixture, to a sulfonic acid salt by the addition of an aqueous solution of a metal hydroxide, and to a sulfonic acid by acidification of the above mixture after the addition of base, or, particularly in the case of the sulfonyl bromides, by the addition of water to the sulfohalogenation reaction mixture.

The particularly preferred class of sulfonic acids provided by the present invention comprises monosubstituted di-tertiary-alkyl peroxides, or the halogen-analogs of such peroxides that contain one or more chlorine or bromine atoms, in which substituted peroxides the substituent is a sulfo group. The particularly preferred class of sulfonic acid salts comprises the alkali metal salts such as the sodium potassium and lithium salts of the particularly preferred sulfonic acids.

The compounds provided by the present invention are particularly valuable in that they render available peroxidic materials having the resistance to violent decomposition upon impact or during storage characteristic of the di-tertiary-alkyl peroxides, and having, at the same time, the characteristics of ionization and solubility of the sulfonic acids and metal sulfonates. We have tested these compounds in polymerization reactions and have found they initiate chain reactions in a manner analogous to known organic peroxides. We have found that they exhibit a pronounced tendency to dissolve in ionic media, particularly in an alkaline media and, as illustrated by Example II, we have found them to be particularly resistant to violent decomposition when subjected to physical impact.

The following examples illustrate in detail individual sulfonic acids and metal sulfonates provided by the present invention as well as methods for their production. As many variations in the structure of the acids and salts are within the scope of the invention, the invention is not to be construed as limited to the particular compounds specified in the examples or to the products of the particular reactions described therein.

*Example I*

The preferred method of preparing starting compounds, from which the compounds provided by the present invention can be prepared by the conversion reactions applicable to the alkyl or aryl sulfonyl halides, is illustrated by the following detailed example.

One mole (146 g.) of di-tertiary-butyl peroxide is placed in a transparent vessel illuminated by a 500 watt bulb at a distance of about six inches. The peroxide is maintained at a temperature of between 6° and 8° C. while a gaseous mixture of sulfur dioxide and chlorine in molar proportions of 3:2 is introduced beneath the surface of the peroxide. The gaseous mixture is passed in at a rate introducing 0.3 mole of sulfur dioxide and 0.2 mole of chlorine in about 90 minutes.

The sulfonyl chloride may be converted by the procedures illustrated by the following examples while dissolved in the reaction products, or it may be isolated and purified, for example, by subjecting the reaction mixture to a low pressure fractional distillation to remove the dissolved gases and unreacted peroxide and, if desired, distillation of the sulfonyl chloride.

The sulfonyl chloride prepared in this manner is 2-tertiary-butylperoxy-2-methylpropanesulfonyl chloride, a water-white liquid boiling from 72–77° C. at 1 mm. pressure and having the formula:

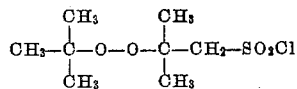

*Example II*

Potassium 2-tertiary-butylperoxy-2-methylpropanesulfonate is prepared by adding 50 grams of a 50% aqueous solution of potassium hydroxide to 15 grams of 2-tertiary-butylperoxy-2-methylpropanesulfonyl chloride, maintained at about 20° C. The potassium sulfonate is isolated by filtering the reaction mixture.

A sample of potassium 2-tertiary-butyl-peroxy-2-methylpropane-sulfonate was prepared by treating the crude sulfochlorination product produced by the process described in Example I in accordance with the above procedure. The sample was dried and upon analysis found to have the following composition:

|  | Found | Theory for $C_8H_{17}O_5SK$ |
| --- | --- | --- |
| Per Cent Carbon | 35.8, 36.0 | 36.4 |
| Per Cent Hydrogen | 6.7, 6.8 | 6.4 |
| Per Cent Sulfur | 11.9 | 12.1 |
| Per Cent Potassium | 14.8, 14.9 | 14.8 |

It has the formula,

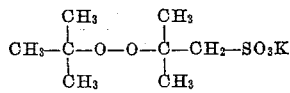

The stability of the salts of the sulfo-substituted organic peroxides provided by the invention to conditions of physical shock was demonstrated by placing a sample of dry potassium 2-tertiary-butyl-peroxy-2-methylpropanesulfonate crystals upon a metal plate and striking them a sharp blow with a hammer. The crystals did not detonate although the impace was sufficient to cause a sharp explosion from the salt of an organic peroxide such as potassium perbenzoate, or a solid peroxide such as diacetyl peroxide.

*Example III*

An alcohol solution of 2-tertiary-butylperoxy-2-methylpropanesulfonic acid is prepared by dissolving 10 grams of potassium 2-tertiary-butyl-peroxy-2-methylpropanesulfonate in 50 cc. of absolute ethanol at about 20° C., adding anhydrous hydrochloric acid until the mixture is acid to moist litmus paper, and removing the precipitated salt by filtration.

A solution of 2-tertiary-butylperoxy-2-methylpropanesulfonic acid was prepared by treating a sample of the potassium salt prepared from sulfochlorinated di-tertiary-butyl peroxide, by the procedure described in Example II, by treating the salt in the above manner. The solution was colorless and was miscible with water, but the free acid was found to be unstable when the alcohol was removed over a water bath under atmospheric pressure, or at room temperature under reduced pressure. The acid has the formula

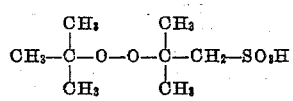

*Example IV*

Potassium 2-(α,α-dimethyl-para-chlorobenzyl peroxy)-2-para-chlorophenylpropanesulfonate is prepared by mixing 10 grams of the corresponding sulfonyl chloride, which can be prepared by sulfochlorination of bis(α,α-dimethyl-parachlorobenzyl) peroxide, with 20 grams of water at about 20° C., adding 40 grams of 50% aqueous potassium hydroxide and allowing the mixture to stand. The potassium sulfonate is separated by filtering the reaction mixture.

The potassium salt prepared in this manner has the formula,

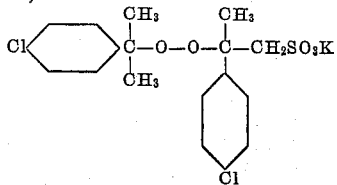

and is a solid compound which is thermally or photochemically decomposed into free radicals and which exhibits the ionic properties of a high molecular weight organic sulfonic acid salt.

*Example V*

Calcium 2-tertiary-butylperoxy-2-methylpropanesulfonate is prepared by adding 10 grams of calcium hydroxide in the form of a saturated aqueous solution to 25 grams of a 2-tertiary-butylperoxy-2-methylpropanesulfonyl chloride and recovering the solid precipitate.

The calcium sulfonate has the formula,

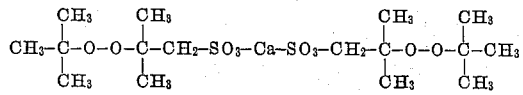

and is a solid compound which is thermally or photochemically decomposed into free radicals and which exhibits the properties of a high molecular weight sulfonic acid salt.

*Example VI*

The dipotassium salt of bis(sulfo-tertiary-butyl) peroxide is prepared by adding 50 grams of 50% aqueous potassium hydroxide to 15 grams of bis(chlorosulfonyl-tertiary-butyl) peroxide, and recovering the solid precipitate.

The dipotassium salt has the formula,

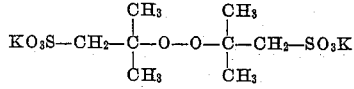

and is a solid compound which is thermally or photochemically decomposed into free radicals and which exhibits the properties of a salt of a disulfonic acid.

We claim as our invention:

1. Potassium 2-tertiary-butylperoxy-2-methylpropanesulfonate.
2. The dipotassium salt of bis(sulfo-tertiary-butyl) peroxide.
3. Potassium 2-(alpha,alpha-dimethylparachlorobenzylperoxy)-2-para-chlorophenylpropanesulfonate.
4. Calcium 2-tertiary-butylperoxy-2-methylpropanesulfonate.
5. 2-tertiary-butylperoxy-2-methylpropanesulfonic acid.
6. Tertiary-alkylperoxyalkanesulfonic acids in which the alkylperoxy radical is attached to a tertiary carbon atom.
7. Alkali metal tertiary-alkylperoxyalkanesulfonates in which the alkylperoxy radical is attached to a tertiary-carbon atom.
8. Sulfonic acids in which the sulfonic acid group replaces a hydrogen atom of a peroxide which consists of two tertiary-hydrocarbon radicals connected by a peroxy group attached to two tertiary-carbon atoms.
9. A compound of the group consisting of a sulfonic acid and the metal salt of the sulfonic acid, which sulfonic acid is a substituted peroxide of the class consisting of peroxides wherein the peroxy group attached to a tertiary-carbon atom in each of two chloro-substituted tertiary-hydrocarbon radicals, in which substituted peroxide the substituents consist of at least one member of the group consisting of the sulfonic acid group and the sulfonic acid salt groups.
10. A compound of the group consisting of a sulfonic acid and the metal salt of the sulfonic acid, which sulfonic acid is a substituted peroxide of the class consisting of peroxides wherein the peroxy group attached to a tertiary-carbon atom in each of two radicals of the group consisting of tertiary-hydrocarbon radicals, chloro-substituted tertiary-hydrocarbon radicals and bromo-substituted tertiary hydrocarbon radicals containing at least one halogen atom of the group consisting of chlorine and bromine atoms, in which substituted peroxide the substituents consist of at least one member of the group consisting of the sulfonic acid group and the sulfonic acid salt groups.

FREDERICK F. RUST.
ALAN R. STILES.
WILLIAM E. VAUGHAN.

No references cited.